United States Patent
Smith et al.

(10) Patent No.: US 9,232,807 B2
(45) Date of Patent: Jan. 12, 2016

(54) DAIRY-BASED FOODS HAVING HIGH LEVELS OF LACTOSE

(75) Inventors: Gary Francis Smith, Glenview, IL (US); Andrew Thomas Mackey, Grayslake, IL (US); Amanda Jane Criezis, Chicago, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 347 days.

(21) Appl. No.: 13/250,876

(22) Filed: Sep. 30, 2011

(65) Prior Publication Data

US 2013/0084364 A1 Apr. 4, 2013

(51) Int. Cl.
| | |
|---|---|
| A23L 1/305 | (2006.01) |
| A23C 23/00 | (2006.01) |
| A23L 1/164 | (2006.01) |
| A23C 9/154 | (2006.01) |
| A23C 13/12 | (2006.01) |
| A23C 13/14 | (2006.01) |
| A23C 19/09 | (2006.01) |

(52) U.S. Cl.
CPC .............. *A23C 9/1544* (2013.01); *A23C 13/12* (2013.01); *A23C 13/14* (2013.01); *A23C 19/0904* (2013.01); *A23V 2200/00* (2013.01)

(58) Field of Classification Search
CPC ........ A23L 1/305; A23L 1/164; A23C 23/00; A23C 19/00; A23C 19/09; A23C 19/0904; A23C 13/14; A23C 9/00; A23C 13/00
USPC ............ 426/93, 580, 582, 583, 632, 618, 519
See application file for complete search history.

(56) References Cited

U.S. PATENT DOCUMENTS

| | | | |
|---|---|---|---|
| 2,319,562 A | 5/1943 | Sharp | |
| 2,565,099 A * | 8/1951 | Simmons | 43/42.03 |
| 2,693,419 A | 11/1954 | Gager | |
| 2,989,400 A * | 6/1961 | Baumann | 426/36 |
| 3,431,112 A | 3/1969 | Durst | |
| 3,903,308 A | 9/1975 | Ode | |
| 3,922,376 A | 11/1975 | Strinning et al. | |
| 3,981,739 A | 9/1976 | Dmitrovsky et al. | |
| 4,055,669 A | 10/1977 | Kelly et al. | |
| 4,083,733 A | 4/1978 | Asano et al. | |

(Continued)

FOREIGN PATENT DOCUMENTS

| | | |
|---|---|---|
| DE | 25 30 164 A1 | 5/1976 |
| EP | 0 113 940 A1 | 7/1984 |

(Continued)

OTHER PUBLICATIONS

European Patent Office Extended European Search Report dated Jul. 15, 2011 for European Application No. 11161326.1, 5 pages.

(Continued)

*Primary Examiner* — Rena L Dye
*Assistant Examiner* — Lela S Williams
(74) *Attorney, Agent, or Firm* — Fitch, Even, Tabin & Flannery LLP (57) ABSTRACT

A dairy-based food component is provided that includes high levels of lactose in moisture, but still retains a smooth and creamy consistency. The compositions and methods provide for higher levels of lactose in moisture phase than previously found possible and still retain low crystal sizes in a finished product to maintain a smooth and creamy texture.

16 Claims, 9 Drawing Sheets

(56) References Cited

U.S. PATENT DOCUMENTS

| | | |
|---|---|---|
| 4,298,625 A | 11/1981 | Cillario |
| 4,444,800 A | 4/1984 | Bixby et al. |
| 4,478,855 A | 10/1984 | Dahlen et al. |
| 4,497,834 A | 2/1985 | Barta |
| 4,499,116 A | 2/1985 | Zwiercan et al. |
| 4,568,557 A | 2/1986 | Becker et al. |
| 4,594,110 A | 6/1986 | Kussendrager et al. |
| 4,673,578 A | 6/1987 | Becker et al. |
| 4,689,238 A | 8/1987 | Hitchner |
| 4,744,998 A | 5/1988 | van Gennip et al. |
| 4,759,940 A | 7/1988 | Cattaneo et al. |
| 4,871,557 A | 10/1989 | Linscott |
| 4,871,573 A | 10/1989 | Bohren et al. |
| 4,955,363 A | 9/1990 | Harju et al. |
| 5,091,201 A | 2/1992 | Murata et al. |
| 5,262,187 A | 11/1993 | Hahn |
| 5,275,830 A | 1/1994 | Smith |
| 5,320,859 A | 6/1994 | Namdari |
| 5,397,589 A | 3/1995 | Korte et al. |
| 5,413,805 A | 5/1995 | Delpierre, III et al. |
| 5,520,946 A | 5/1996 | Chablaix |
| 5,612,074 A | 3/1997 | Leach |
| 5,759,612 A | 6/1998 | van Dalsem et al. |
| 5,786,008 A | 7/1998 | Humphry et al. |
| 5,935,634 A | 8/1999 | Gamay et al. |
| 6,033,696 A | 3/2000 | Aebischer et al. |
| 6,103,283 A | 8/2000 | Zukerman et al. |
| 6,117,478 A | 9/2000 | Dubberke |
| 6,214,404 B1 * | 4/2001 | Han et al. ............ 426/582 |
| 6,548,099 B1 | 4/2003 | Baker et al. |
| 6,592,915 B1 | 7/2003 | Froseth et al. |
| 6,607,760 B2 | 8/2003 | Burri et al. |
| 6,667,068 B2 | 12/2003 | Smith |
| 6,773,734 B2 | 8/2004 | Sirohi et al. |
| 6,830,768 B2 | 12/2004 | Neidlinger et al. |
| 6,863,909 B2 | 3/2005 | Baensch et al. |
| 6,875,449 B1 | 4/2005 | Marriott et al. |
| 7,097,870 B2 | 8/2006 | Funk et al. |
| 7,118,774 B2 | 10/2006 | Coleman et al. |
| 7,198,812 B2 | 4/2007 | Forte et al. |
| 7,220,442 B2 | 5/2007 | Gautam et al. |
| 7,235,276 B2 | 6/2007 | Allen et al. |
| 7,351,439 B2 | 4/2008 | Zukerman et al. |
| 2002/0039608 A1 | 4/2002 | Sirohi et al. |
| 2003/0091697 A1 | 5/2003 | Froseth et al. |
| 2003/0196957 A1 | 10/2003 | Henningfield et al. |
| 2004/0005400 A1 | 1/2004 | Zukerman et al. |
| 2004/0185149 A1 | 9/2004 | Prosise et al. |
| 2004/0208967 A1 | 10/2004 | Getler |
| 2004/0241313 A1 | 12/2004 | Nana et al. |
| 2005/0002989 A1 | 1/2005 | Palmer et al. |
| 2005/0181019 A1 | 8/2005 | Palmer et al. |
| 2005/0226960 A1 | 10/2005 | Boice et al. |
| 2006/0078593 A1 | 4/2006 | Strozier et al. |
| 2006/0115553 A1 | 6/2006 | Gautam et al. |
| 2006/0115554 A1 | 6/2006 | Gautam et al. |
| 2006/0128953 A1 | 6/2006 | Shi et al. |
| 2007/0231450 A1 | 10/2007 | Coleman et al. |
| 2007/0286937 A1 | 12/2007 | Baechler et al. |
| 2008/0020098 A1 | 1/2008 | Gautam et al. |
| 2009/0081308 A1 | 3/2009 | Kussendrager et al. |
| 2009/0263557 A9 | 10/2009 | Venneri |
| 2011/0250327 A1 | 10/2011 | Smith et al. |

FOREIGN PATENT DOCUMENTS

| | | |
|---|---|---|
| EP | 0 090 775 B1 | 9/1985 |
| EP | 0 178 074 A1 | 4/1986 |
| EP | 0 115 617 B1 | 8/1986 |
| EP | 0 340 857 B1 | 3/1993 |
| EP | 0 402 555 B1 | 6/1993 |
| EP | 0 938 848 A1 | 9/1999 |
| EP | 1 151 676 A1 | 11/2001 |
| EP | 1 166 647 A2 | 1/2002 |
| JP | 02-276547 A | 11/1990 |
| JP | 08-112062 A | 5/1996 |
| WO | WO 96/33619 * | 10/1996 ............ A23D 7/015 |
| WO | 97/21354 A1 | 6/1997 |
| WO | 99/11147 A1 | 3/1999 |
| WO | 00/56171 A1 | 9/2000 |

OTHER PUBLICATIONS

Vincent Zehren and D. D. Nusbaum, Process Cheese, Cheese Reporter Publishing Company, Incorporated, 1993, Chapter 18, Other Dairy Ingredients, "Whey and Nonfat Dry Milk" by L. L. Van Slyke and W. V. Price, pp. 215-223.

Vincent Zehren and D. D. Nusbaum, Process Cheese, Cheese Reporter Publishing Company, Incorporated, 1993, Chapter 23, pp. 376-379.

\* cited by examiner

DAIRY-BASED FOODS HAVING HIGH LEVELS OF LACTOSE

FIELD

The field relates to dairy-based foods and, in particular, dairy-based foods having high levels of lactose in moisture generally without lactose crystals causing a grainy or sandy texture.

BACKGROUND

Increasing the levels of dairy ingredients in foods, such as confections, cheeses, spreads, snack bars, cereal bars, and the like, is often desired due to the nutritional benefits that many of the components in dairy ingredients impart to foods. For example, it may be beneficial to increase the amount of whey or milk components in processed cheeses or cheese spreads to increase the levels of protein. Snack and cereal bars are popular with consumers for their ease in providing a convenient and ready-to-eat product. Chewy snack and cereal bars can, in some instances, be more desired by consumers because they resemble the texture and mouthfeel of candy bars. Dairy-based components can be used as binders in snack and cereal bars. It may also be beneficial to provide an increased level of dairy protein in the snack and cereal bars.

However, when using large amounts of dairy ingredients in foods, it also generally results in a corresponding increase in the amount of lactose. For example, whey and non-fat dry milk powders generally comprise about 65 percent and about 50 percent lactose, respectively. Thus, increasing the amounts of these ingredients in foods can also result in corresponding increases in the lactose composition of the resulting foods as well. Increasing lactose in food can, in some cases, have undesired effects on the organoleptic characteristics of the food.

For instance, heating foods containing high levels of dairy ingredients and the corresponding high levels of lactose may cause organoleptic problems due to the solublization of the lactose in the moisture phase of the food. Upon cooling, the lactose may solidify into crystals that can grow into relatively large agglomerates. Such large crystals or agglomerates may result in a gritty mouthfeel or a food that does not have texturally smooth or creamy characteristics. Lactose tends to solublize in moisture when exposed to temperatures of about 130° F. or more. Thus, lactose crystallization tends to be a problem in foods and other comestibles, which desire a smooth and creamy texture, when the dairy ingredients are exposed to temperatures of at least about 130° F., such as during manufacturing, pasteurizing, and/or storage.

In view of this undesired lactose crystallization, it is generally accepted that there is a limit to the amount of dairy components, and thus the amount of lactose, that can be added to dairy-based foods while still retaining a smooth and creamy texture. If dairy components are added at too high a level, then the high levels of associated lactose may result in even a greater tendency for large lactose crystal growth. Large lactose crystals detract from the smooth eating experience of the foods. In order to minimize this tendency, the book PROCESS CHEESE (Vincent L. Zehren) states there is a maximum limit to the amount of lactose that can be included in certain dairy-based foods in order to avoid large crystal formation in the moisture phase. Zehren states that the reported levels of lactose should not be exceeded due to the possibility of causing the formation of large lactose crystals.

In some cases, attempts have been made to minimize lactose crystal growth by purposely forming crystals through seeding, controlling lactose crystal growth via a combination of high temperatures and high shear, or conversion of the lactose to other ingredients. Prior processes that attempt to control lactose crystal size through seeding use lactose micro-crystals. This approach is generally undesired because the lactose micro-crystals complicate the manufacturing process with extra ingredients and process steps. It is often difficult to add the crystals at precisely the correct time and temperature. With lactose seed crystals, good mixing is needed and such additions are difficult to control because the small seeding crystals can melt easily rendering them ineffective as a seed crystal. Prior processes that attempt to control crystal growth through high temperatures and high shear are generally undesired because exposing products with high levels of dairy proteins and lactose to high temperatures can also result in other undesired organoleptic problems due to browning of the dairy components. High shear levels can also increase temperatures to undesired levels. Lactose can also be converted to glucose and galactose through the addition of lactase enzymes. However, these processes are also undesired because lactase enzymes can add additional costs and processing times for the enzyme to convert the lactose to its monosaccharides. Lactose conversion may also impart other undesired organoleptic changes, such as darker colors, increased sweetness, and softer textures.

SUMMARY

A dairy-based food component is provided that includes high levels of lactose in moisture, but still retains a smooth and creamy consistency. As mentioned in the background, it was generally accepted that the amount of lactose in the moisture phase was limited due to the undesired crystallization of the lactose. The compositions and methods herein provide for higher levels of lactose in moisture than previously found possible and still retain small crystal sizes in a finished product to maintain a smooth and creamy texture.

DETAILED DESCRIPTION

As mentioned in the background, it is generally accepted that the amount of lactose solubilized in moisture or the moisture phase within dairy-based foods was limited due to the undesired crystallization of the lactose, which can result in a grainy or sandy texture. Large lactose crystals are generally undesired in foods that are intended to have a smooth and creamy texture. This crystallization effect tended to limit the amount of dairy ingredients that can be used in certain foods. For example, as also mentioned in the background, Vincent Zehren reports in PROCESS CHEESE ranges for the maximum level of dairy components, and therefore, the maximum levels of lactose suitable for processed cheeses and spreads. Zehren states that lactose exceeding these maximum levels results in undesired crystal growth. From Zehran's data, provided in Table 1 below and shown in FIG. 1, the maximum acceptable lactose-in-moisture phase (LIMP) can be calculated and plotted relative to the moisture level. Lactose-in-moisture phase is a parameter that quantifies the amount of lactose functionalized or soublized in a moisture phase within a dairy-based food component or other food component. As used herein, LIMP or LIMP value is the weight percent lactose divided by the sum of the weight percent lactose and the weight percent moisture as provided in formula A LIMP=Lactose wt %/(Lactose wt %+Moisture wt %)     (A).

Figure 1:
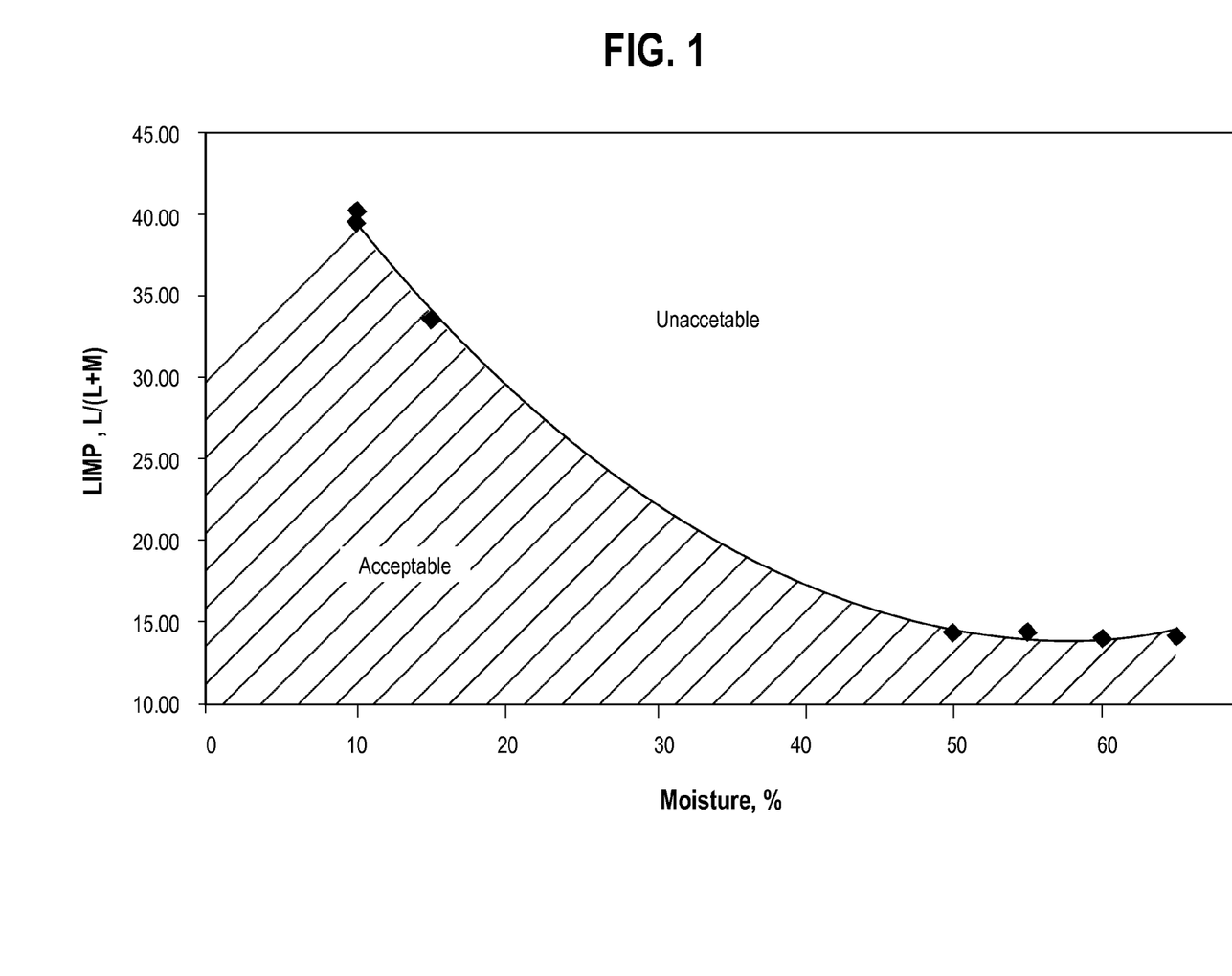
FIG. 1 is a plot of lactose-in-moisture phase as a function of moisture level.

FIG. 1 represents the maximum amounts of LIMP previously accepted in dairy-based foods so that large lactose crystal growth was generally minimized and/or avoided. The curve as set forth in FIG. 1 can be generally defined as formula (B)

LIMP=0.0117 (wt % moisture)$^2$−1.3207 (weight % moisture)+51.474     (B).

LIMP values relative to weight percent moisture below curve B was previously known to result in acceptable lactose crystal sizes for smooth and creamy applications. On the other hand, LIMP values relative to weight percent moisture above curve B was previously understood to result in large lactose crystals and generally deemed unacceptable for food applications desiring smooth and creamy textures. (Process Cheese, Zehran). Thus, this lactose crystallization effect tends to be a problem in compositions with high levels of dairy components.

able range of FIG. 1 (above the curve identified in formula B) and, at the same time, exhibiting a smooth and creamy texture resulting from relatively small lactose crystals. By one approach, the compositions and methods herein result in dairy based products having a LIMP value above the curve in FIG. 1 defined by formula B and lactose crystals with an average size of about 100 microns or less, in some cases, about 60 microns or less, and in yet other cases, about 15 microns or less. By another approach, the compositions and methods have a LIMP value above the curve in FIG. 1 defined by formula B and an average lactose crystal size between about 15 and about 100 microns, in other cases, between about 15 and about 60 microns, and in other cases, between about 40 and about 60 microns, and in yet other cases, between about 20 and about 40 microns.

In another aspect, the composition and methods herein provide dairy-based foods with a moisture content from about 20 to about 65 percent and a LIMP value of at least about 30, in some cases, at least about 33, and in other cases, about 30 to about 50 and in yet other cases, about 33 to about 44. These compositions are effective to form or may have the average lactose crystal sizes mentioned above.

In yet another aspect, the compositions and methods herein achieve such high levels of LIMP values relative to moisture

TABLE 1

Data from Zehran's Process Cheese Regarding Maximum Lactose in Moisture phase

| Moisture, % | Maximum Whey, % | Amount of Lactose in Whey, % | Maximum NFDM, % | Amount of Lactose in NFDM, % | Maximum Calculated Lactose in either Whey or NFDM, % | Maximum Calculated Acceptable LIMP based on Data from Zehran, L/(L + M) |
|---|---|---|---|---|---|---|
| 10 | 10.1 | 65 | | | 6.5 | 39.63 |
| 15 | 11.7 | 65 | | | 7.6 | 33.64 |
| 50 | 13 | 65 | | | 8.4 | 14.46 |
| 55 | 14.3 | 65 | | | 9.2 | 14.46 |
| 60 | 15.6 | 65 | | | 10.1 | 14.46 |
| 65 | 16.9 | 65 | | | 10.9 | 14.46 |
| 10 | | | 13.5 | 50 | 6.7 | 40.30 |
| 15 | | | 15.2 | 50 | 7.6 | 33.63 |
| 50 | | | 16.9 | 50 | 8.4 | 14.46 |
| 55 | | | 18.6 | 50 | 9.3 | 14.46 |
| 60 | | | 20.3 | 50 | 10.1 | 14.47 |
| 65 | | | 22 | 50 | 11.0 | 14.47 |

The compositions and methods herein, on the other hand, provide dairy-based foods and other comestibles with high levels of lactose in moisture (LIMP) previously found unacceptable and, at the same time, unexpectedly provide for small lactose crystals effective to form a smooth and creamy texture. That is, the compositions and methods herein allow dairy-based and other comestibles to have a LIMP value relative to weight percent moisture to fall above the curve in FIG. 1, and into the region previously not thought possible, while still resulting in a smooth and creamy texture. To this end, it was unexpectedly discovered that lactose crystal sizes were impacted differently at different LIMP ranges and at different temperature exposures of the dairy ingredients. At certain LIMP values, temperature has little to no effect at minimizing lactose crystal sizes. However, at higher LIMP valves, a selected temperature range has a dramatic effect at minimizing lactose crystal sizes.

In one aspect, the compositions and methods herein provide for dairy-based foods with a moisture phase to have LIMP values falling within the previously thought unacceptby carefully controlling the temperature exposure of the dairy components and/or food products including the dairy ingredients. By one approach, the dairy components and/or the compositions herein are exposed to temperatures from about 130° F. to 155° F. Temperature exposures of the dairy ingredients below about 130° F. are generally not a problem with lactose crystallization because lactose tends not to soublize in water at such temperatures in the LIMP region of interest. At temperatures above 155° F., however, it has been discovered that a dramatic increase in average lactose crystal sizes occurs over a LIMP values of about 33. While not wishing to be limited by theory, once the LIMP gets to at least about 30 or about 33 or higher, the effect of temperature exposure on the dairy ingredients appears to be one factor that controls the average lactose crystal sizes. While not wishing to be limited by theory, it is believed that within the combination of the LIMP region of interest and temperature exposure limits described herein, the lactose in moisture may be partially melting and forming some small lactose crystals. Again, not wishing to be limited by theory, there may be a sufficiently high number of these small formed lactose crystals that survive the heat treatment and then become sites for the solublized lactose to form small crystals as the product cools. This is achieved without adding any additional seed crystals.

Figure 2:
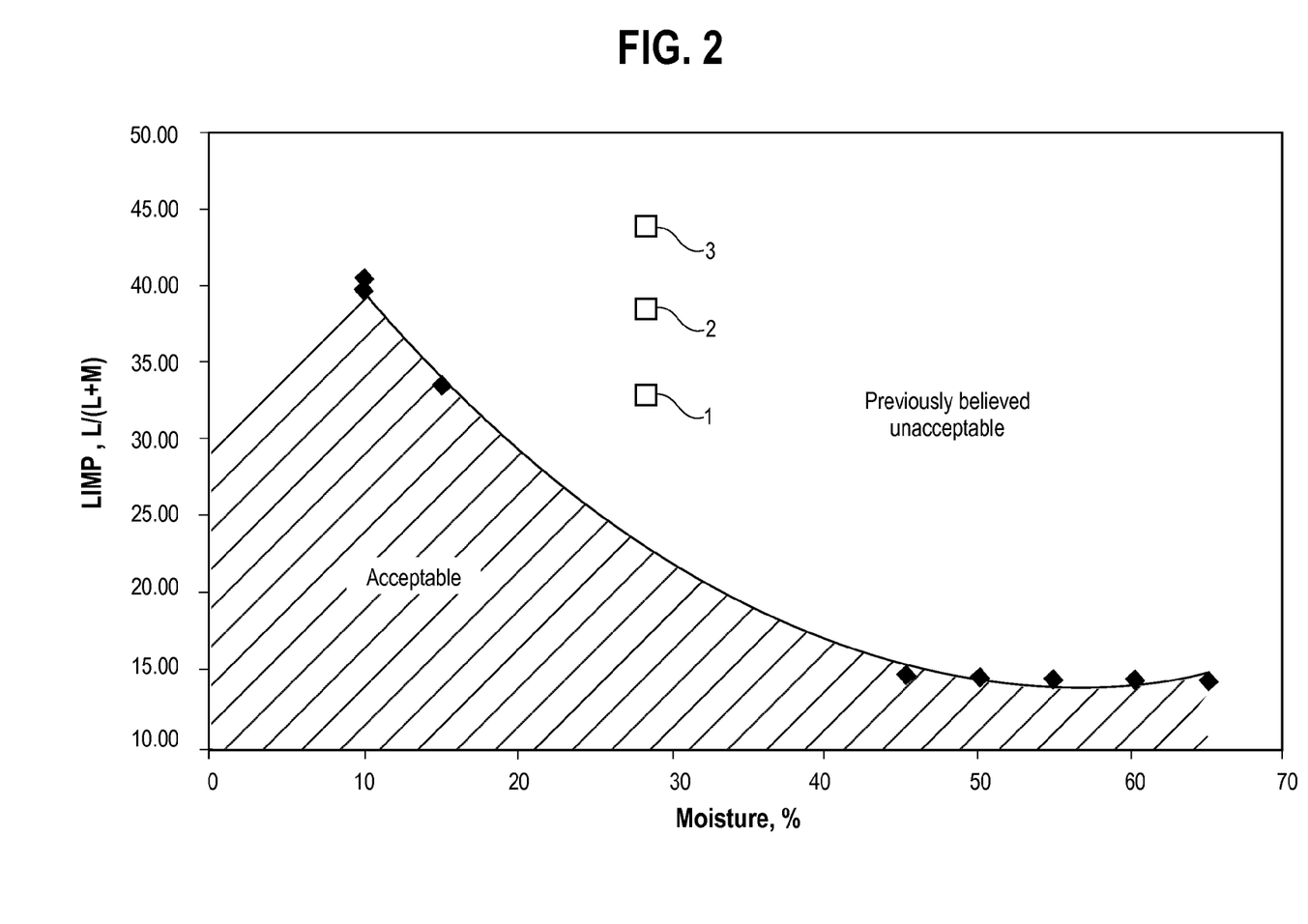
FIG. 2 is a plot of lactose-in-moisture phase as a function of moisture level.

FIG. 2 illustrates compositions, discussed further below in the Examples, of dairy-based binders that have small lactose crystals of about 100 microns or less over a temperature exposure of about 130° F. to 155° F., but a LIMP value relative to weight percent moisture well into the unacceptable ranges previously not thought possible in dairy-based foods. These compositions at a moisture level of about 28% have a LIMP value from about 33 to about 44 and have an average lactose crystal size of about 15 to about 100 microns over a temperature exposure range of about 130° F. to 155° F. If these compositions have a LIMP below about 33 or are exposed to temperatures above 155° F., then large lactose crystal growth is observed.

Compositions herein may also have low levels of whey protein denaturation. By one approach, compositions and methods herein are effective so that no additional whey protein denaturation occurs such that the level of whey protein denaturation of the whey proteins is substantially maintained.

Compositions herein may also achieve the high levels of LIMP and small lactose crystal sizes substantially free of or without substantial use of any added lactose seed crystals or other seeding components. As used herein, without substantial use of lactose seed crystals or other seeding generally means less than about 0.5 percent added seeding crystals or other added crystal forming components, in some cases less than about 0.05 percent added seeding components, and in other cases, less than about 0.01 percent added seeding components, and in yet other cases, no added seeding components.

In one example, dairy based binders may be one composition suitable for the approaches discussed herein. For instance, dairy based binders with the high LIMP values may be suitable as a binder for snack and cereal bars; however, other applications may also be used. In one approach, an exemplary dairy based binder may include a blend of dairy proteins, dairy fats, and other components in amounts sufficient to render binding functionality to the composition. In another approach, the compositions may include dairy proteins, whey proteins, casein proteins, dairy fats, water soluble fiber, and/or maltodextrin.

In yet another approach, compositions may include about 15 to about 33 percent dairy proteins selected from non-fat dry milk (high heat or low heat), whey protein powders, and milk protein concentrates. The composition may also include from 0 to about 15 percent mouthfeel enhancers, such as polysaccharides, maltodextrin, and the like; about 1 to about 5 percent sweetener; about 30 to about 35 percent cream or other fat source; about 1 to about 5 percent added water; and about 12 to about 15 percent soluble fibers such as oligofructose and the like. Other compositions and ingredients may be appropriate based on the end use. For example, cheeses and cheese spreads may also include emulsifiers, salts, and the like suitable for such application. In general, however, the moisture phase in the compositions herein include moisture from added water plus moisture provided from other composition ingredients.

In some approaches, the compositions may also be free of significant amounts of sugar syrups, gums, and/or humectants, which may be referred to herein as non-dairy binding ingredients. Free of significant amounts generally means less than about 0.1 percent, preferably, less than about 0.01 percent, and most preferably, no sugar syrups, gums, and/or humectants. As used herein, humectants include, but are not limited to, glycerin, sorbitol, mannitol, propylene glycol, butylene glycol, maltitol, and the like; gums include, but are not limited to, carrageenan, guar gum, locust bean, gum Arabic, xanthan, pectin, gelatin, carboxy-methylcellulose, and the like; and sugar syrups include, but are not limited to, corn syrup, isomalt, maltitol, maltose syrups, and the like.

In one form, the protein in an exemplary dairy-based binder may be obtained from aqueous dairy components, dry dairy components, and blends thereof. For example, the aqueous dairy component may be liquid dairy sources, moist or semi-solid dairy sources, and mixtures thereof. The dry dairy component may be obtained from various dairy powders having little or no moisture (i.e., generally less than about 5 percent moisture). For example, the dairy-based binder can be formed from blends of water and dairy ingredients from one or more of the aqueous and/or dry dairy sources in amounts to achieve the desired levels of moisture, solids, protein, and lactose described above.

By one approach, suitable aqueous dairy components for the binder include milk (such as skim, reduced fat, 2 percent, whole) cream, condensed milk, sweetened condensed milk, condensed fat-free milk, sweetened condensed fat-free milk, ultrafiltered milk, ultrafiltered condensed milk, yogurt, other cultured dairy products, and the like. Suitable solid or semi-solid dairy ingredients include yogurts, other cultured dairy products, dairy pastes, cheeses (such as cream cheese, cottage cheese, ricotta, Cheddar, Neufchatel, processed, and the like) and the like. Suitable powdered dairy ingredients include milk powders, cultured powders, non-fat dry milk powders, skim milk powders, milk protein concentrate powders, whey protein concentrate powders, whey powders, non-fat dry milk powders, and the like.

In another approach, the dairy-based binder component may be blended in a substantially uniform manner with an edible or dry base component. By one approach, an exemplary composition using the dairy-based binder may include up to about 60 percent of an edible base component, preferably, about 35 to about 50, and most preferably, about 35 to about 45 percent blended with the dairy-based binder having the LIMP values, moisture ranges, crystal sizes, and temperature exposure limits mentioned above. By one approach, the edible or dry base component may include grains, granola, oats, nuts, and the like as well as mixtures thereof. In other approaches, the edible or dry base component may also include fruits, cookies, raisins, soy crisps, oatmeal, cereals, cake, cookies, pretzels, pasta, grain based products, starches, rice, wheat, other amylaceous materials, and the like, and mixtures thereof. Optionally, the bar may also be blended with various inlays or other ingredients as desired, such as various intermediate and high moisture fruits, nuts, raisins, candies, flavors, nutrients, and the like. If such inlays are included, it is preferred that snack and cereal bar includes about 5 to about 8 percent of such inlays. If desired, the bar may also be coated or enrobed or have blended therein a coating, such as chocolate, caramel, and the like. Alternatively, the bar may have multiple layers of the binder, edible base component with various fillings, fruit, and/or coatings therebetween.

The dairy-based binder may also include a number of optional ingredients depending on the particular application. For example, the binder may include emulsifiers, emulsifying salts, stabilizers, bulking agents, preservatives, colorants, vegetable or dairy fats, sweeteners, flavors, edible acids, fruits, nuts, nutrients, vitamins, mineral supplements (e.g., calcium fortification), and starches among other ingredients. For example, optional binder ingredients may include titanium dioxide (for color), potassium sorbate (preservative), maltodextrin (filler), soy lecithin (emulsifier), wheat dextrin (filler), soy fiber (fiber source), anhydrous milk fat (creaminess), salt, starches, and lactic acid. Suitable optional emulsifying salts may include, for example, sodium citrate, potassium citrate, monosodium phosphate, disodium phosphate, trisodium phosphate, sodium aluminum phosphate, sodium tripolyphosphate, sodium hexametaphosphate, dipotassium phosphate, sodium acid pryrophosphate, and the like, as well as mixtures thereof. If used, sodium citrate, disodium phosphate, or mixtures thereof are the preferred optional emulsifying salts. Suitable emulsifiers may also include, for example, monoglycerides, diglycerides, polysorbates, sodium stearoyl lactylate, lecithin, and mixtures thereof as well as the like. If used, monoglycerides, diglycerides, sodium stearoyl lactylate, and mixtures thereof are the preferred optional emulsifiers. Preferably, such emulsifiers may be used in aerated solid milk products. The dairy-based binder may optionally include sweeteners, such as non-lactose sweeteners. The sweeteners may also be artificial sweeteners. For instance, the binder may include sucrose, dextrose, fructose, glucose, maltose, corn syrup, honey, and non-nutritive sweeteners. If used, the preferred sweetener is sucrose. The added sugars or sweeteners can be added separately or via sweetened condensed milk. Preferably, as discussed above, the non-dairy sweetener is less than about 40 percent of the binder, and preferably, about 8 to about 16 percent.

The dairy based binder may also optionally include added edible vegetable and dairy fats. Suitable edible fats include, for example, butter, cream, anhydrous milk fat, vegetable fats, coco butter, and mixtures thereof as well as the like. If used, the edible fat may generally have a melting point less than about 50° C. In other cases, it may be desired to use edible fats with a melting point of about 35 to about 45° C. If used, the edible fat is preferably anhydrous milk fat, and preferably melted prior to incorporation in the binder or binder/base blend.

If desired, these optional ingredients can be incorporated into the binder or bar so long as these additives do not interfere or adversely effect the desired properties (i.e., firmness, water level, processing requirements, and the like). If included, these additives generally constitute less than about 10 percent of the final product (except the sweetener). Such additives can be added either during the initial blending or after essentially all components have been hydrated. Preferably, solid additives may be added during the shear treatment and liquid additives may be added during the initial blending. Of course, in cases where it is desired to maintain the physical integrity of the additives (e.g., fruit, nut, or grain pieces), the addition may generally be completed under low shear conditions.

The dairy-based binder component of the snack and cereal bars may also be aerated. In an aerated product, the overrun of the aerated dairy-based binder component and/or final bar may be about 5 to about 100 percent and, in some cases, about 15 to about 60 percent. Other aeration levels may also be used as appropriate. Aerated dairy based binders preferably contain about 0.05 to about 0.7 percent emulsifier, and more preferably about 0.15 to about 0.4 percent emulsifier. For example, the dairy binder may be aerated using a gas injection such as, for example, air, nitrogen, or carbon dioxide. Other aeration techniques may also be used. Generally, the aerated binder may have a density of less than about 1.14 g/ml as compared to a density of about 1.2 to about 1.3 g/ml for the unaerated product. Aeration can be used to prepare dairy based binders which resemble ice cream, yogurt, and the like.

By another exemplary approach, a dairy-based comestible having high levels of lactose in moisture and a smooth texture is provided herein. The dairy-based comestible may include a dairy protein component providing dairy protein and lactose to the dairy-based comestible. By one approach, comestibles may include about 14 to about 22 percent lactose and about 10 to about 65 percent moisture to provide a lactose-in-moisture phase of about 33 to about 44 percent calculated as the weight percent lactose divided by the sum of the weight percent lactose plus the weight percent moisture. In some cases, the comestible may also include about 8 to about 15 percent protein obtained from a dairy source. The comestible may also have a maximum temperature exposure of at least the dairy protein component and, in some cases, the comestible between about 130° F. and 155° F. effective such that lactose crystal sizes are an average of about 100 microns or below within the moisture phase to provide a smooth texture to the dairy-based comestible. In yet another approach, the dairy-based comestible may also have a lactose-in-moisture phase between about 10 and about 65 percent moisture that is greater than about $0.0117$ (weight % moisture)$^2$−$1.3207$ (weight % moisture)+$51.474$ and the lactose crystal size is about 100 microns or less at the same time. In another approach, the dairy based comestible may have a LIMP value of about 30 to about 50 (in other cases, about 33 to about 44) and about 20 to about 65 percent moisture while providing a smooth and creamy texture with the lactose crystal sizes described above.

The dairy protein component in the dairy-based comestible may be from an aqueous dairy protein source, a dry dairy protein source, and mixtures thereof. The aqueous dairy source may be from cheese, cream, milk, yogurt, cultured dairy products, and mixtures thereof. The dry dairy protein source may be from non-fat dry milk, milk powders, milk protein concentrate, whey protein concentrate, cultured powders, and mixtures thereof.

Optionally, the dairy-based comestible may be blended with other components. For example, a food composition may include about 40 to about 60 percent of the dairy-based comestible and about 60 to about 40 percent of a dry base blended with the dairy-based comestible. The dry base includes about 30 to about 45 percent grains, nuts, granola, oats, or mixtures thereof and up to about 5 percent of a low or intermediate water activity fruit with a water activity less than about 0.5.

Turning now to an exemplary method of forming the high lactose products herein. By one approach, the method of forming the products carefully controls the maximum temperature exposure of the ingredients, and in particular, the lactose containing dairy ingredients, as mentioned above. For example, the dairy-based foods (and in particular the dairy components thereof) as well as any final composition thereof has a maximum temperatures exposure of about 130° F. to 155° F. That is, the composition, dairy components, and/or the final product are not exposed to temperatures below about 130° F. or above 155° F.

An exemplary method will be described with respect to forming a dairy-based binder suitable for use in cereal and snack bars; however, other methods may be used depending on the application and type of product. To prepare the exemplary binder, the various liquid and dry ingredients are blended within the selected temperature ranges. First, a dairy-based binder component is prepared by blending a dairy protein source(s) with added water (if needed). The blend is mixed under high and/or low shear conditions until a homogenous paste is obtained. In one approach, during the mixing and blending, the temperature may be maintained between about 130° F. to 155° F. After the homogenous paste is obtained, any optional dry base component may be added or mixed into the paste to form an intermediate blend. During this mixing step, the temperature of the intermediate blend is maintained between about 130° F. and 155° F. After these mixing steps and in some approaches, the resultant mixture or intermediate blend may be rapidly cooled, such as to below about 100° F. and, in some cases, to below about 50° F. to form a cooled intermediate blend in a relatively short amount of time. In some cases, the composition may be rapidly cooled from the blending temperature to the cooling temperature within about 1 to about 5 minutes. In some approaches, this rapid cooling may also aid, among the other factors, in forming the crystal sizes mentioned above within the LIMP and blending temperature ranges. A scraped-surface heat exchanger may be used in some applications, for example. If desired, the intermediate blend or binder component can be homogenized before cooling.

In some approaches, average lactose crystal size may be much more consistent for compositions within the desired LIMP values and temperature exposure ranges described herein. By one approach, with a LIMP value of about 30 to about 33 (in some cases about 33), variation in average crystal size over the temperature range of about 130 to 155° F. is about +/−12 microns or less, and in some cases, about +/−9 microns or less. Compositions below the LIMP values described herein and/or having temperature exposures above 155° F. have dramatically higher variation in average crystal sizes. In general, the variation in average crystal sizes is lower for compositions within the desired LIMP ranges and temperature ranges described herein.

Advantages and embodiments of the dairy-based compositions described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Comparative Example 1

Dairy-based binders were prepared to evaluate the effect of lactose-in-moisture relative to temperature exposure and lactose crystal sizes. Compositions of Table 1 were prepared and evaluated for lactose crystal size at a variety of temperatures from 130° F., the minimum temperature for lactose to solublize in water, up to about 170° F.

Each sample A and sample B of Table 1 was prepared by first blending the liquid and fat in a Thermomix blender and heating to 100° F. to melt the fat. Next, the non-fat dry milk was added while blending. Then, the maltodextrin and soluble fibers were added while blending. The product was then heated to the desired temperature. Once the desired temperature was attained, the agitation was turned down to provide simple mixing and held for about 1 minute at the prescribed temperature. An approximately 30 gram sample was taken in a cup. The cup was placed in a refrigerator and cooled. Samples were evaluated for lactose crystal size using polarized light microscopy. Image analysis for quantification was performed using Image Pro Plus 5.1. The sample gathering procedure was then repeated at the other temperatures.

Figure 3:
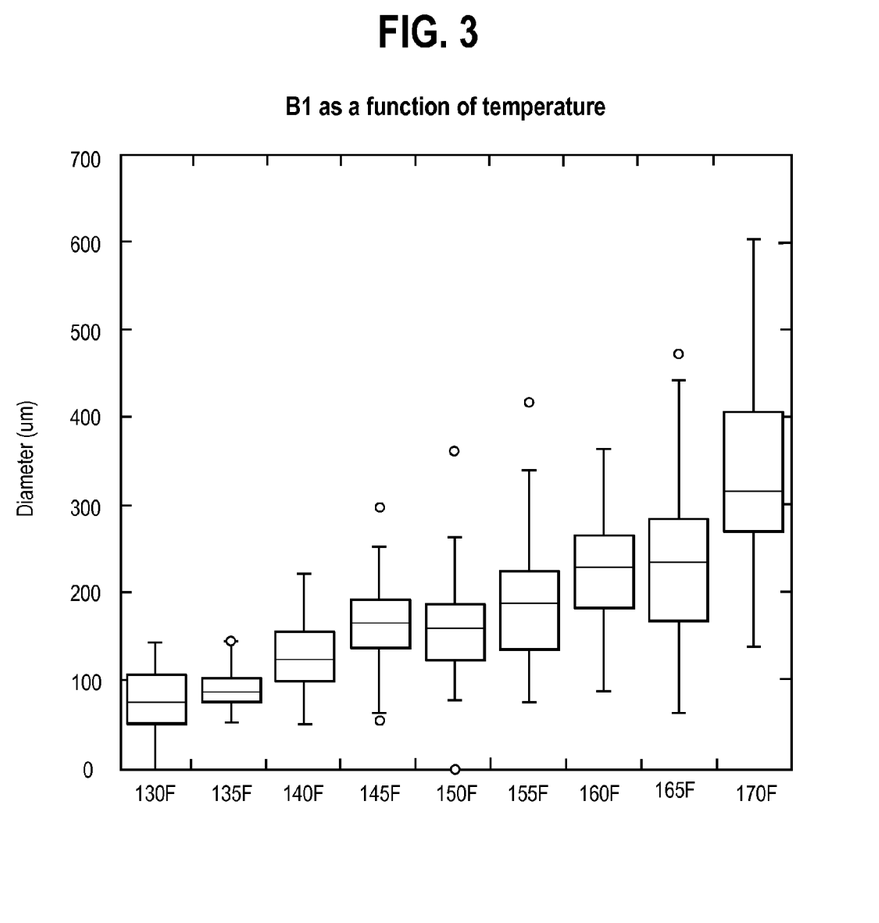
FIGS. 3-9 are graphs of lactose crystal size as a function of temperature.
Figure 4:
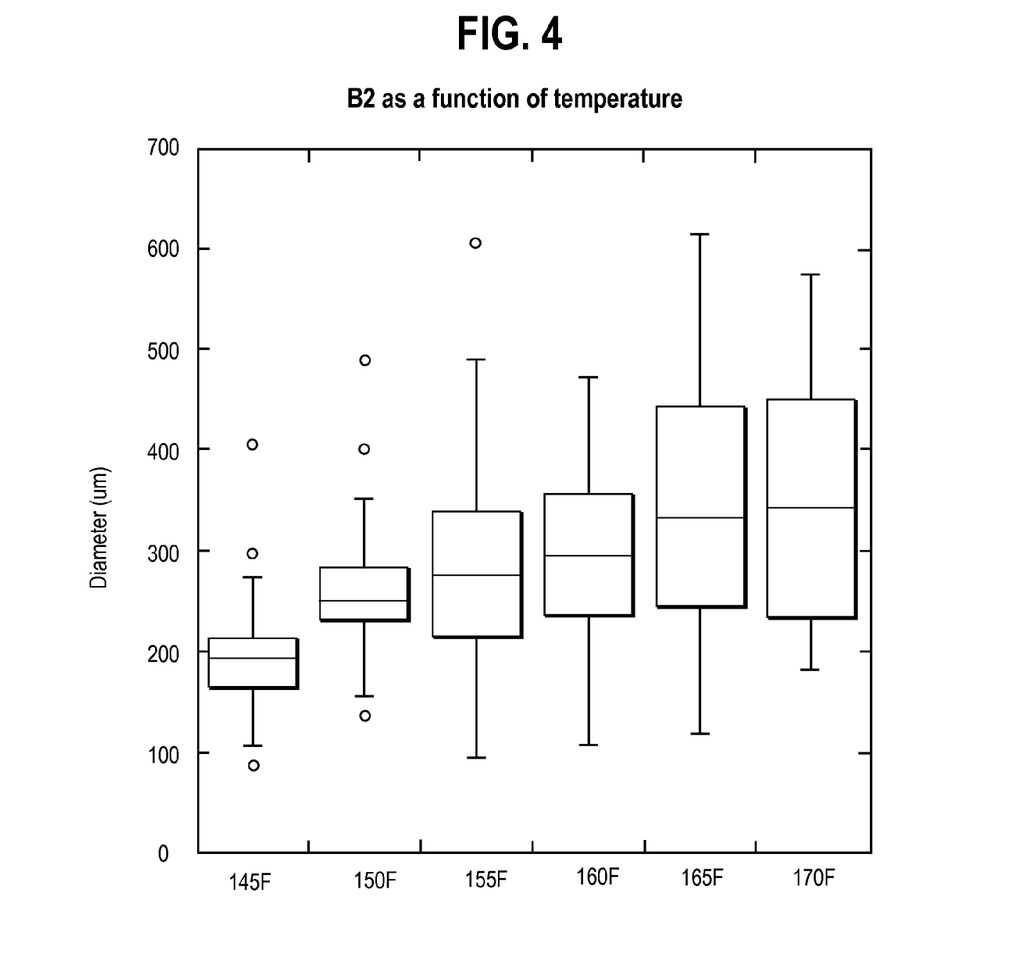

Crystal size data is shown in Table 2 below, and FIGS. 3 and 4 graphically show the lactose crystal size based on temperature exposure. As shown in Table 2 and FIGS. 3 and 4, the compositions are not capable of forming small lactose crystal of about 100 microns or less over the entire temperature range from about 130° F. to 155° F.

TABLE 2

Comparative Compositions

| Ingredient | Comparative A Wt % | Comparative B Wt % |
|---|---|---|
| NFDM | 12.4% | 18.8% |
| Maltodextrin | 16.0% | 13.9% |
| Sucrose | 1.4% | 1.4% |
| Cream (37%) | 37.3% | 37.3% |
| Water | 2.8% | 2.8% |
| Soluble Fiber | 12.0% | 12.0% |
| Butter | 12.0% | 12.0% |
| Milk Protein Concentrate (70% protein) | 5.0% | 1.7% |
| Lactose | 8.1 | 10.8 |
| Moisture | 28.4 | 28.4 |
| LIMP | 22.2 | 27.6 |

TABLE 3

Crystal Size by Temperature Exposure

| Temperature, ° F. | Comparative A Average Lactose Crystal Size, Microns | Comparative B Average Lactose Crystal Size, Microns |
|---|---|---|
| 130 | 88.9 +/− 29.0 | — |
| 135 | 90.9 +/− 20.8 | — |
| 140 | 126.0 +/− 35.2 | — |
| 145 | 164.4 +/− 49.8 | 195.1 +/− 50.2 |
| 150 | 165.2 +/− 50.9 | 258.2 +/− 54.5 |
| 155 | 190.0 +/− 67.4 | 292.4 +/− 101.4 |
| 160 | 222.3 +/− 64.9 | 296.2 +/− 85.4 |
| 165 | 239.4 +/− 90.1 | 349.5 +/− 126.7 |
| 170 | 340.3 +/− 99.4 | 348.2 +/− 117.9 |

Example 2

Dairy-based binders consistent with the disclosure herein and exhibiting high levels of LIMP and small lactose were prepared as in Table 4. The compositions were prepared similar to that described in Comparative Example 1. Table 5 provides the lactose crystal sizes and FIGS. 5-8 graphically show the results.

Figure 5:
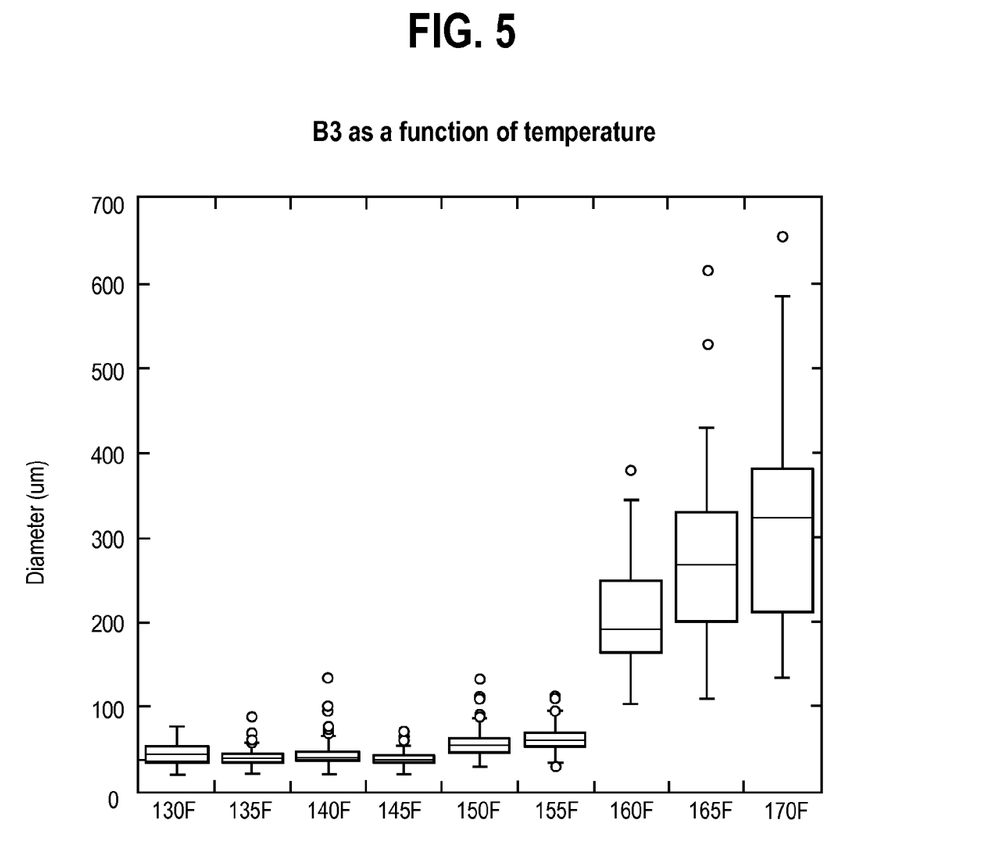
Figure 6:
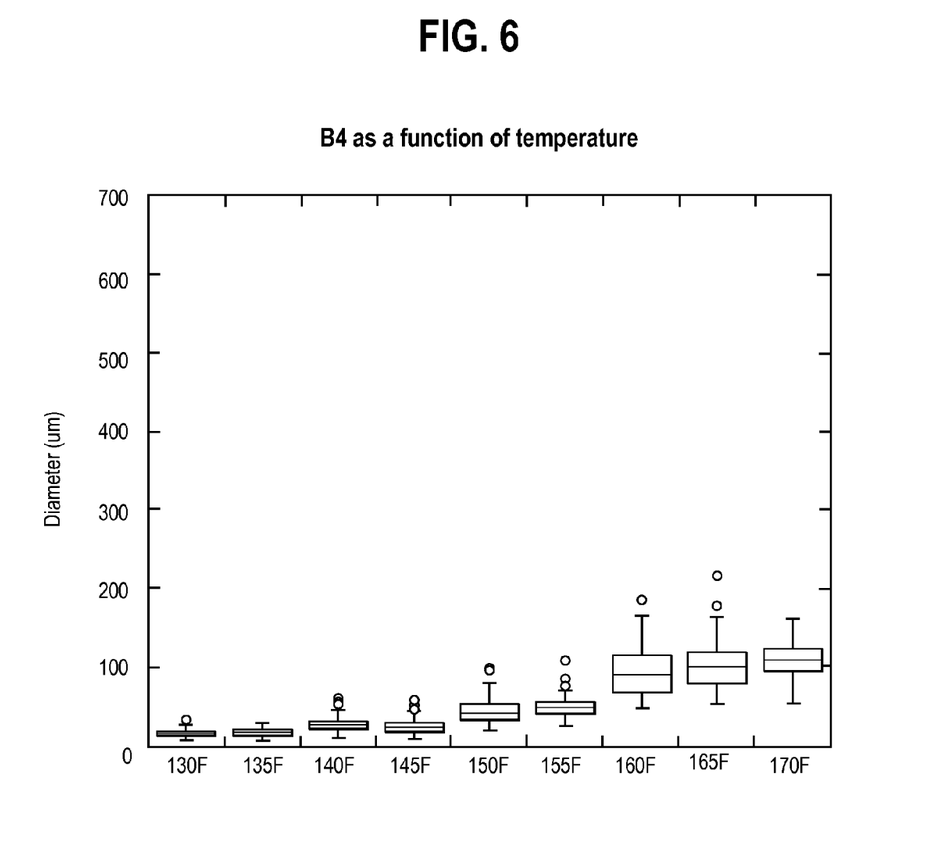
Figure 7:
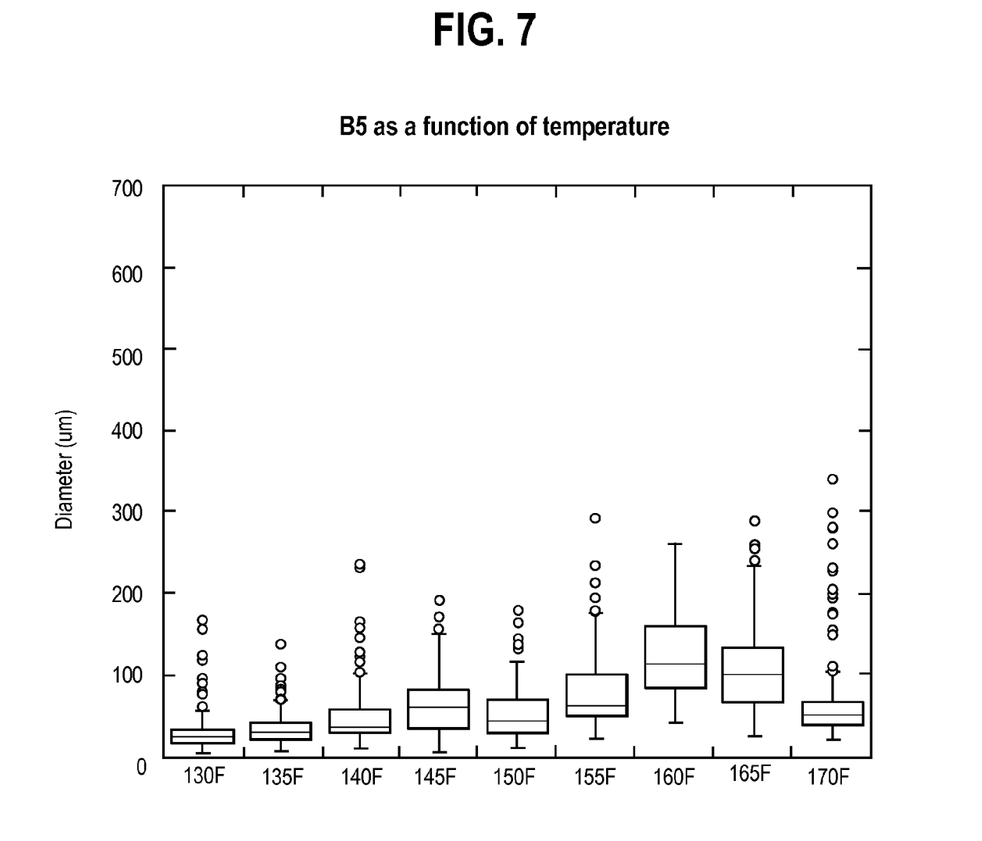
Figure 8:
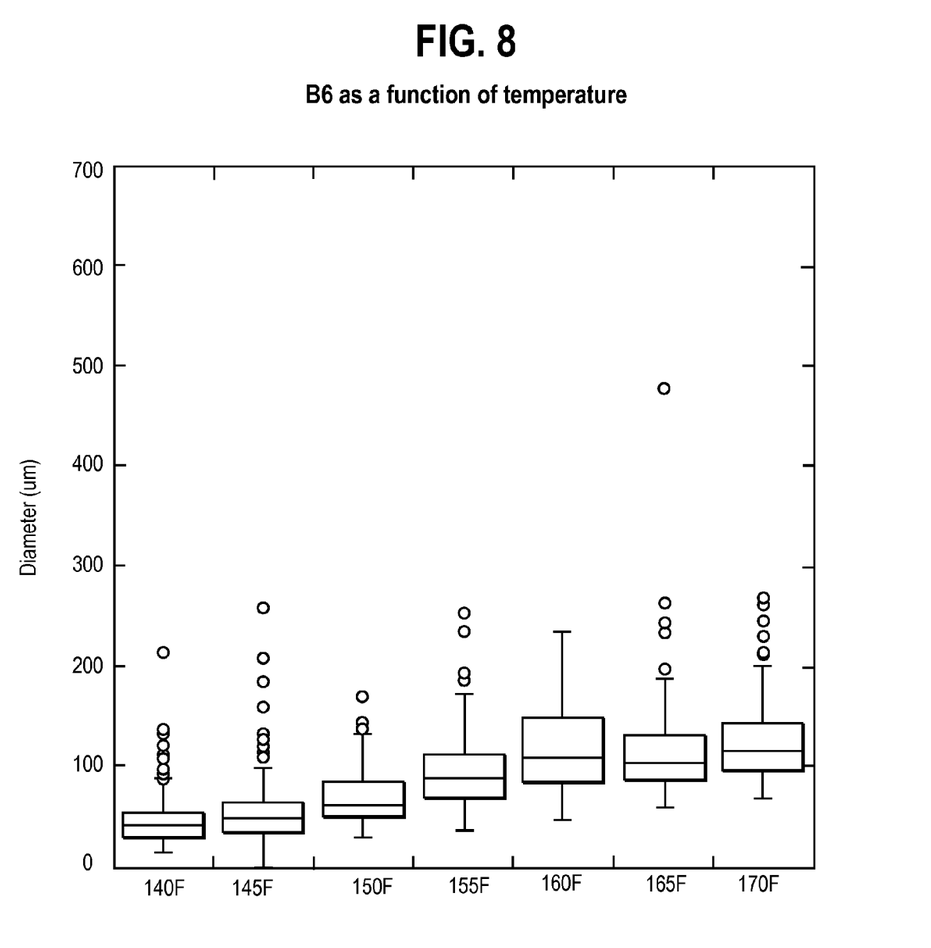

The results show that even with much higher levels of LIMP than previously thought possible, the compositions still have an average lactose crystal size below about 100 microns over the entire temperature range of about 130° F. to 155° F. As shown in FIG. 5, there is a surprising and dramatic jump in crystal size in composition C if the temperature exposure is increased to 160° F. The jump in crystal size occurs in samples D, E, and F, but is less pronounced.

TABLE 4

Compositions as described herein

| Ingredients | C Wt % | D Wt % | E Wt % | F Wt % |
|---|---|---|---|---|
| NFDM | 25.3 | 25.4 | 23.6 | 19 |
| Maltodextrin | 6.0 | 9.1 | 4.6 | 0 |
| Sucrose | 1.4 | 1.40 | 1.4 | 1.4 |
| Cream (37%) | 37.3 | 37.3 | 37.3 | 37.3 |
| Water | 2.8 | 2.8 | 2.8 | 2.8 |
| Soluble Fiber | 15.1 | 12.0 | 12.0 | 12.0 |
| Butter | 12.1 | 12.1 | 12.1 | 12.1 |
| Whey protein | 0 | 0 | 6.4 | 15.5 |
| Lactose | 14.0 | 14.0 | 17.8 | 22.3 |
| Moisture | 28.3 | 23.3 | 28.3 | 28.3 |
| LIMP | 33.0 | 33.0 | 38.6 | 44.1 |

TABLE 5

Crystal Size by Temperature Exposure

| Temperature, °F. | C Average Lactose Crystal Size, Microns | D Average Lactose Crystal Size, Microns | E Average Lactose Crystal Size, Microns | F Average Lactose Crystal Size, Microns |
|---|---|---|---|---|
| 130 | 44.6 +/− 11.5 | 16.7 +/− 4.7 | 31.2 +/− 23.3 | — |
| 135 | 40.1 +/− 9.4 | 17.2 +/− 5.4 | 36.6 +/− 20.1 | — |
| 140 | 42.8 +/− 15.3 | 28.2 +/− 8.5 | 52.3 +/− 38.6 | 44.9 +/− 25.3 |
| 145 | 37.6 +/− 8.7 | 25.4 +/− 10.4 | 61.9 +/− 37.7 | 55.6 +/− 35.1 |
| 150 | 57.3 +/− 15.9 | 44.4 +/− 15.7 | 55.2 +/− 32.7 | 69.1 +/− 26.8 |
| 155 | 62.1 +/− 15.2 | 49.3 +/− 12.6 | 81.7 +/− 46.1 | 92.7 +/− 36.6 |
| 160 | 208.7 +/− 68.2 | 94.9 +/− 31.3 | 125.8 +/− 50.8 | 116.7 +/− 43.4 |
| 165 | 272.6 +/− 98.3 | 103.1 +/− 29.1 | 110.5 +/− 54.2 | 115.3 +/− 49.7 |
| 170 | 318.1 +/− 123.8 | 109.0 +/− 22.7 | 73.8 +/− 61.8 | 123.8 +/− 40.1 |

Figure 9:
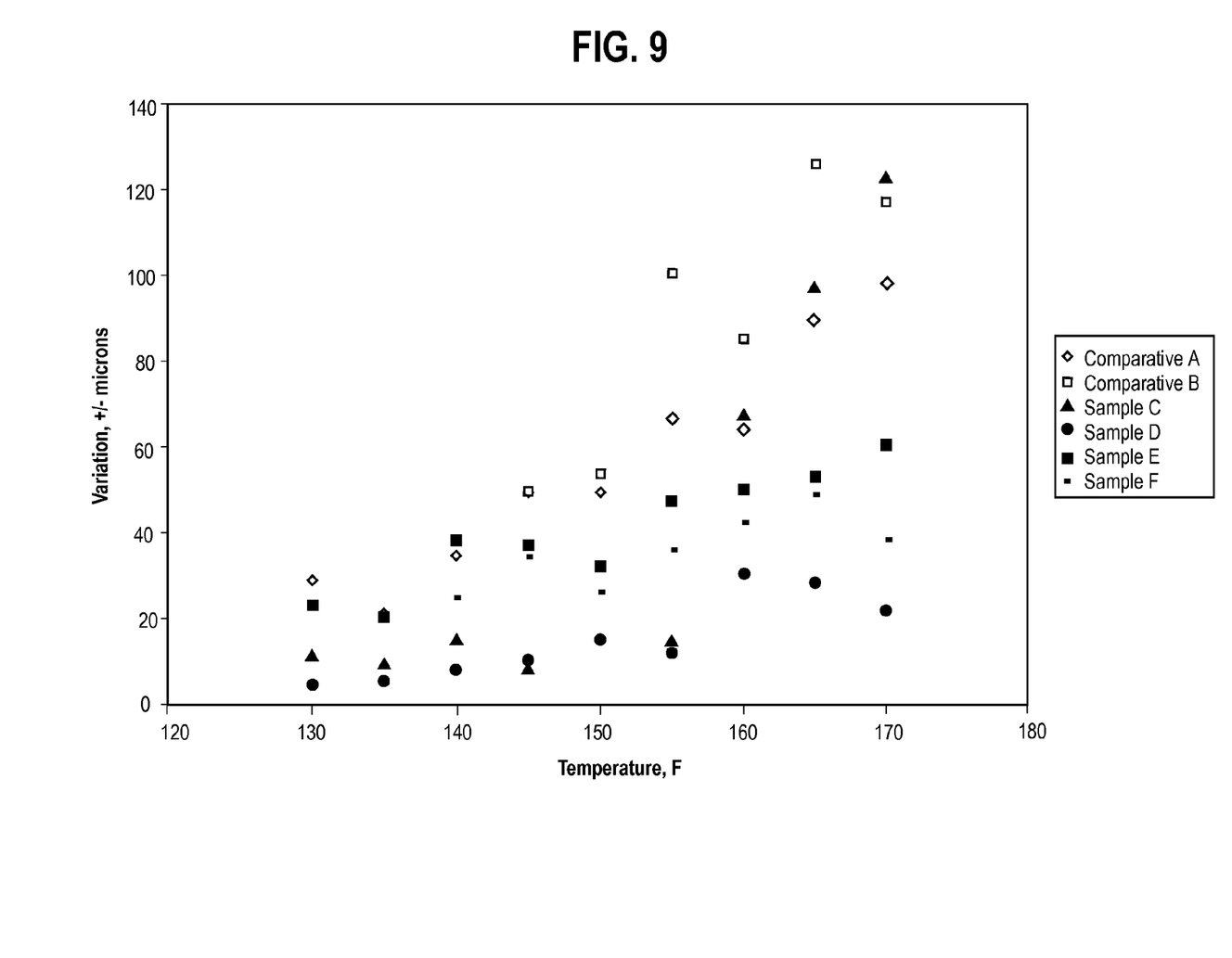

FIG. 9 is a plot of the variation in average lactose crystal sizes observed in Comparative Example 1 and Example 2. It shows that the variation of samples C, D, E, and F tends to be lower than Comparative samples A and B over the same temperature range.

It will be understood that various changes in the details, materials, and arrangements of the process, formulations, and ingredients thereof, which have been herein described and illustrated in order to explain the nature of the method and dairy-based compositions may be made by those skilled in the art within the principle and scope of the embodied method as expressed in the appended claims.

What is claimed is:

1. A dairy-based comestible having high levels of lactose in moisture and a smooth texture, the dairy-based comestible comprising:
   a dairy protein component providing dairy protein and lactose to the dairy-based comestible;
   about 14 to about 22 percent lactose by total weight of the dairy-based comestible;
   about 10 to about 65 percent moisture by total weight of the dairy-based comestible; and
   a lactose-in-moisture phase of about 30 to about 50 percent calculated as the weight percent of the lactose divided by the sum of the weight percent of the lactose plus the weight percent of the moisture, the lactose-in-moisture phase including lactose crystals;
   wherein the lactose crystals have an average size of about 100 microns or below within the moisture phase to provide a smooth texture to the dairy-based comestible; and
   wherein the dairy-based comestible is substantially free of added lactose seed crystals.

2. The dairy-based comestible of claim 1, wherein the lactose-in-moisture phase percentage is greater than $0.0117$ (weight % moisture)$^2$ − $1.3207$ (weight % moisture) + $51.474$.

3. The dairy-based comestible of claim 1, wherein the dairy protein component is selected from the group consisting of an aqueous dairy protein source, a dry dairy protein source, and mixtures thereof.

4. The dairy-based comestible of claim 3, wherein the aqueous dairy source is selected from cheese, cream, milk, yogurt, cultured dairy products, and mixtures thereof.

5. The dairy-based comestible of claim 3, wherein the dry dairy protein source is selected from non-fat dry milk, milk powders, milk protein concentrate, whey protein concentrate, cultured powders, and mixtures thereof.

6. The dairy-based comestible of claim 1, further comprising a dry base blended with the dairy-based comestible to form a food composition, wherein the food composition comprises about 40 to about 60 percent of the dairy-based comestible by total weight of the food composition and about 60 to about 40 percent of the dry base by total weight of the food composition.

7. The dairy-based comestible of claim 6, wherein the dry base includes about 30 to about 45 percent by total weight of the dry base of grains, nuts, granola, oats, or mixtures thereof and up to about 5 percent by total weight of the dry base of a low or intermediate water activity fruit with a water activity less than about 0.5.

8. The dairy-based comestible of claim 1, further comprising about 20 to about 65 percent moisture by total weight of the dairy-based comestible and the LIMP is about 33 to about 44 percent.

9. A dairy-based composition having high levels of lactose in moisture and a smooth texture, the dairy-based composition comprising:
   a dairy protein component providing dairy protein and lactose to the dairy-based comestible;
   about 10 to about 65 percent moisture by total weight of the dairy-based comestible; and
   a lactose-in-moisture phase calculated as the weight percent of the lactose divided by the sum of the weight percent of the lactose plus the weight percent of the moisture, the lactose-in-moisture phase percentage being greater than about $0.0117$ (weight % moisture)$^2$ − $1.3207$ (weight % moisture) + $51.474$, the lactose-in-moisture phase including lactose crystals;
   wherein the lactose crystals within the moisture phase have a size that is about 100 microns or below; and
   wherein the dairy-based composition is substantially free of added lactose seed crystals.

10. The dairy-based comestible of claim 9, wherein the lactose-in-moisture phase is about 33 to about 44 percent.

11. The dairy-based comestible of claim 9, wherein the dairy protein component is selected from the group consisting of an aqueous dairy protein source, a dry dairy protein source, and mixtures thereof.

12. The dairy-based comestible of claim 11, wherein the aqueous dairy source is selected from cheese, cream, milk, yogurt, cultured dairy products, and mixtures thereof, and wherein the dry dairy protein source is selected from non-fat dry milk, milk powders, milk protein concentrate, whey protein concentrate, cultured powders, and mixtures thereof.

13. The dairy-based comestible of claim 9, further comprising a dry base including about 30 to about 45 percent by total weight of the dry base of grains, nuts, granola, oats, or mixtures thereof and up to about 5 percent by total weight of the dry base of a low or intermediate water activity fruit with a water activity less than about 0.5 is combined with the dairy-based composition.

14. The dairy-based comestible of claim 9, further comprising about 20 to about 65 percent moisture by total weight of the dairy-based comestible.

15. The dairy-based comestible of claim 1, further comprising about about 8 to about 15 percent protein by total weight of the dairy-based comestible.

16. The dairy-based comestible of claim 9, further comprising about about 8 to about 15 percent protein by total weight of the dairy-based comestible.

* * * * *